(12) United States Patent
Iriyama

(10) Patent No.: US 6,988,028 B2
(45) Date of Patent: Jan. 17, 2006

(54) CRUISE CONTROL SYSTEM

(75) Inventor: Masahiro Iriyama, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 40 days.

(21) Appl. No.: 10/337,900

(22) Filed: Jan. 8, 2003

(65) Prior Publication Data
US 2003/0136596 A1 Jul. 24, 2003

(30) Foreign Application Priority Data
Jan. 24, 2002 (JP) .................................... 2002-014951

(51) Int. Cl.
*B60K 31/00* (2006.01)

(52) U.S. Cl. ........................ 701/93; 701/95; 180/179; 123/352

(58) Field of Classification Search ............. 701/93–97; 123/352; 180/170, 176–179
See application file for complete search history.

(56) References Cited

U.S. PATENT DOCUMENTS 4,890,231 A * 12/1989 Frantz ......................... 701/97
4,896,267 A * 1/1990 Frantz et al. ................ 701/97
4,922,428 A * 5/1990 Takahashi .................... 701/94
6,078,859 A * 6/2000 Jastrzebski et al. ......... 701/93

FOREIGN PATENT DOCUMENTS

| EP | 1 106 417 A2 | 6/2001 |
| JP | 2715606 B2 | 11/1997 |
| WO | WO 90/13452 A1 | 11/1990 |

* cited by examiner

*Primary Examiner*—Gary Chin
(74) *Attorney, Agent, or Firm*—Foley & Lardner LLP

(57) ABSTRACT

A cruise control system is adapted to a vehicle equipped with an internal combustion engine and a manual transmission which are disengageably connected through a clutch. The cruise control system is arranged to calculate a first vehicle operation indicative quantity based on an engine speed detected by an engine speed sensor, to calculate a second vehicle operation indicative quantity based on a wheel speed detected by a wheel speed sensor, to determine whether a deviation between the first vehicle operation indicative quantity and the second vehicle operation indicative quantity is greater than a predetermined value, and to cancel the cruise control when the deviation is greater than the predetermined value.

9 Claims, 3 Drawing Sheets

CRUISE CONTROL SYSTEM

BACKGROUND OF THE INVENTION

The present invention relates to a cruise control system for a vehicle equipped with a manual transmission.

Japanese Patent No. 2715606 discloses a cruise control system which controls an output of an engine so that a vehicle equipped with a manual transmission travels at a preset vehicle speed.

SUMMARY OF THE INVENTION

However, this cruise control system comprises a clutch switch for outputting a clutch signal indicative of a disengaged state of a clutch provided between the engine and the manual transmission, for the purpose of determining a cancel timing of a cruise control in response to the disengagement of the clutch. This provision of the clutch switch increases a production cost of the cruise control system.

It is therefore an object of the present invention to provide an improved cruise control system which cancels a cruise control when a clutch is disengaged during the cruise control, without employing a clutch switch.

An aspect of the present invention resides in a cruise control system for a vehicle equipped with an internal combustion engine and a manual transmission connected to the engine through a clutch, the clutch being capable of engaging and disengaging the engine and the manual transmission, the manual transmission being capable of producing a plurality of gear ratios and of selecting one of the gear ratios, the cruise control system comprising: a first speed sensor detecting a first speed indicative of a rotation speed of the engine; a second speed sensor detecting a second speed indicative of a wheel speed of the vehicle; and a controller connected to the first and second speed sensors, the controller being configured to start a cruise control for controlling an output of the engine according to a driver's demand so that the vehicle travels at a preset vehicle speed, to calculate a first vehicle operation indicative quantity based on the first speed, to calculate a second vehicle operation indicative quantity based on the second speed, to determine whether a deviation between the first vehicle operation indicative quantity and the second vehicle operation indicative quantity is greater than a predetermined value, to cancel the cruise control when the deviation is greater than the predetermined value.

Another aspect of the present invention resides in a method of canceling a cruise control executed by a cruise control system for a vehicle, the vehicle being equipped with an internal combustion engine and a manual transmission connected to the engine through a clutch, the clutch being capable of engaging and disengaging the engine and the manual transmission, the manual transmission being capable of producing a plurality of gear ratios and selecting one of the gear ratios, the method comprising: detecting a first speed indicative of a rotation speed of the engine; detecting a second speed indicative of a wheel speed of the vehicle; starting a cruise control for controlling an output of the engine according to a driver's demand so that a vehicle travels at a preset vehicle speed; calculating a first vehicle operation indicative quantity based on the first speed; calculating a second vehicle operation indicative quantity based on the second speed; determining whether a deviation between the first vehicle operation indicative quantity and the second vehicle operation indicative quantity is greater than a predetermined value; and canceling the cruise control when the deviation is greater than the predetermined value.

The other objects and features of this invention will become understood from the following description with reference to the accompanying drawings.

DETAILED DESCRIPTION OF THE INVENTION

Figure 1:
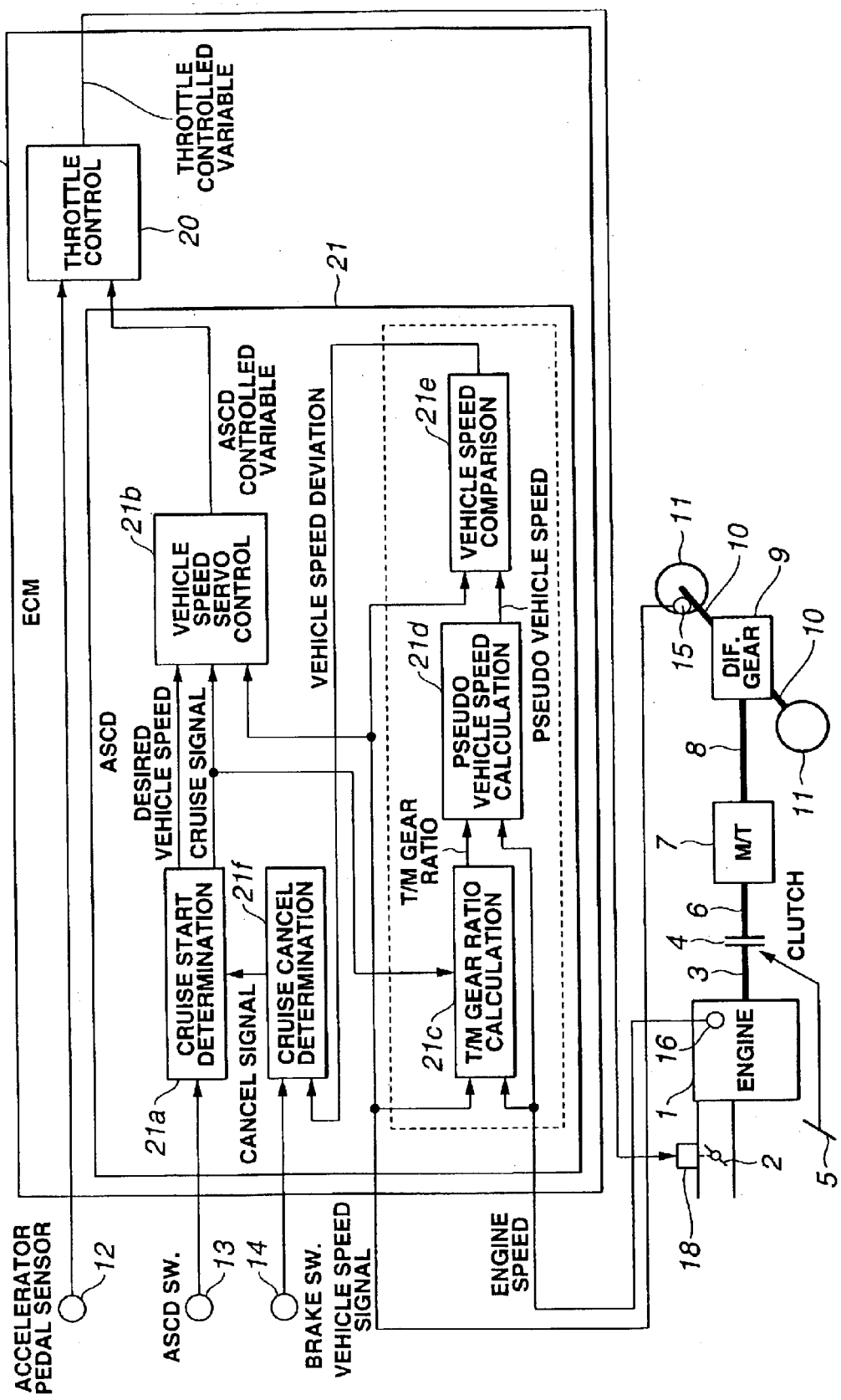
FIG. 1 is a system view of a cruise control system according to an embodiment of the present invention.
Figure 2:
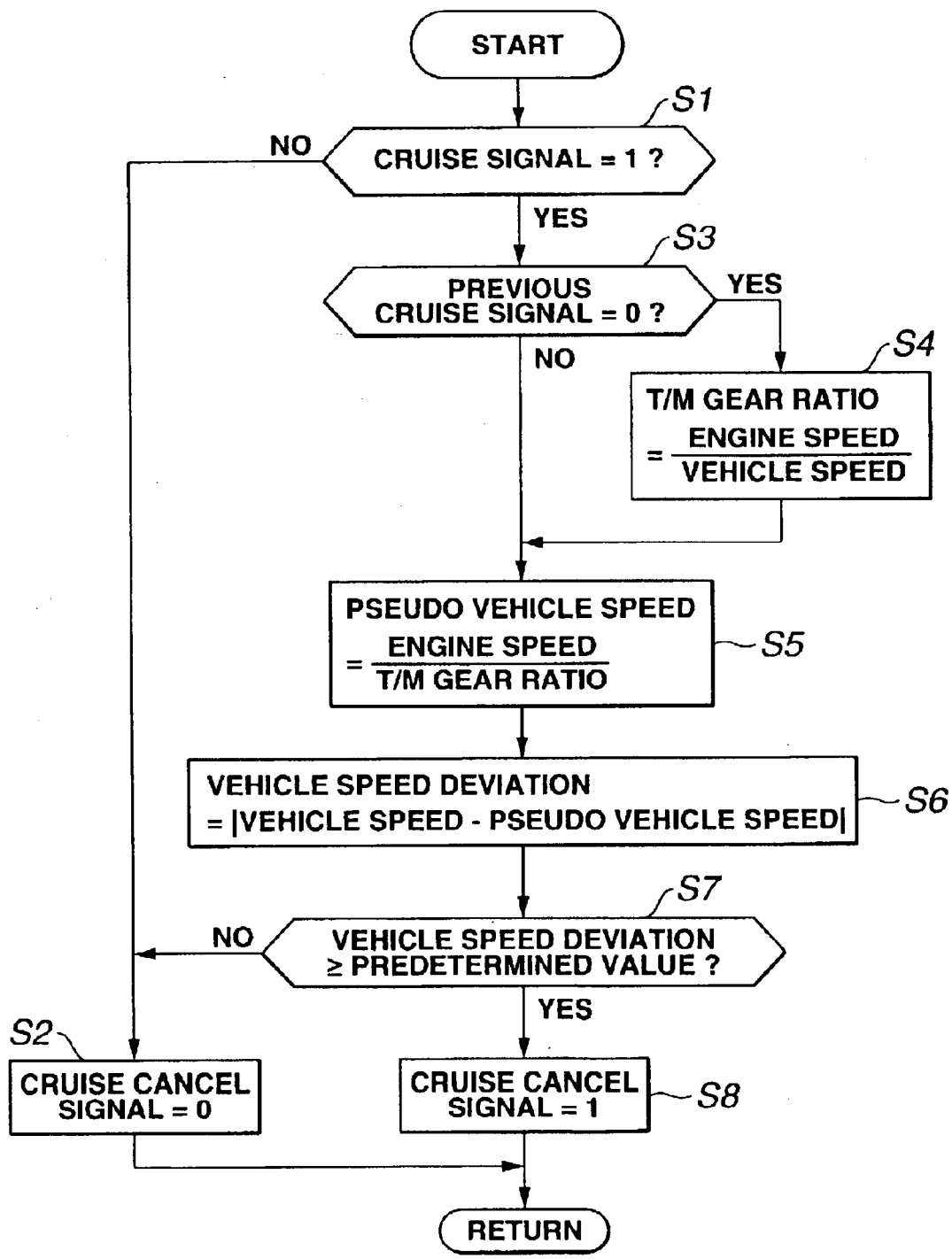
FIG. 2 is a flowchart showing a program of a cruise-control canceling operation executed by an engine controller of the cruise control system of FIG. 1.

Referring to FIGS. 1 and 2, there is shown an embodiment of a cruise control system according to the present invention.

As shown in FIG. 1, a vehicle equipped with the cruise control system comprises an internal combustion engine (prime mover) 1, an electronically controlled throttle valve 2, an engine output shaft 3, a clutch 4, a clutch pedal 5, a transmission input shaft 6, a manual transmission 7, a transmission output shaft 8, a differential gear 9, axles 10, and driving wheels 11.

Manual transmission 7 is connected with engine 1 through clutch 4. Manual transmission 7 comprises a plurality of gear couples which produce a plurality of gear ratios. By operating a shift lever through a driver's operation, one of the gear couples is selected so as to select a desired gear ratio.

Clutch 4 is disposed between engine 1 and manual transmission 7. According to the driver's operation of a clutch pedal 5, the engagement and disengagement of clutch 4 is executed so as to connect and disconnect engine 1 and manual transmission 7.

Further as shown in FIG. 1, the cruise control system according to the present invention comprises an accelerator pedal sensor 12 for detecting a depression of an accelerator pedal of engine 1, a cruise control switch (ASCD switch) 13 for being manually turned on to start the cruise control, a brake switch 14 for detecting a depression of a brake pedal, a wheel speed sensor 15 functioning as drive-line rotation speed detecting means and transmission output rotation speed detecting means, an engine speed sensor 16 functioning as prime mover output rotation speed detecting means, an engine controller 17, and a throttle control actuator 18.

Engine controller 17 comprises a throttle control section 20 for outputting a throttle controlled variable supplied to throttle control actuator 18, and a cruise control section 21 for calculating an ASCD (Auto Speed Control Device) controlled variable.

Throttle control section 20 receives an accelerator manipulated-variable indicative signal from accelerator pedal sensor 12 and an ASCD controlled-variable indicative signal from cruise control section 21. Further, throttle control section 20 outputs throttle controlled-variable to throttle control actuator 18 according to the received signals.

Cruise control section 21 comprises a cruise start determining section 21a, a vehicle-speed servo control section 21b, a transmission gear ratio calculating section 21c functioning as transmission gear ratio calculating means, a pseudo vehicle speed signal calculating section 21d functioning as pseudo output rotation speed calculating means, a vehicle speed comparing section 21e functioning as output rotation speed deviation calculating means, and a cruise cancellation determining section 21f functioning as cruise control canceling means).

Cruise start determining section 21a employs the vehicle speed detected at a moment when cruise control switch 13 is turned on, as a desired vehicle speed, and outputs a signal indicative of the desired vehicle speed to vehicle speed servo control section 21b. When the cruise control is started and when cruise start determining section 21a does not receive a cruise cancel signal set at 1 from cruise cancel determining section 21f, cruise start determining section 21a outputs a cruise continuation signal set at 1 to vehicle speed servo control section 21b. When cruise start determining section 21a receives a cruise cancel signal set at 1 from cruise cancellation determining section 21f, cruise start determining section 21a outputs a cruise continuation signal set at 0 to vehicle speed servo control section 21b.

Vehicle speed servo control section 21b receives the desired vehicle speed indicative signal and the cruise continuation signal from cruise start determining section 21 and the vehicle speed indicative signal from wheel speed sensor 15. Vehicle speed serve control section 21b calculates ASCD controlled variable on the basis of the received signals and outputs the obtained ASCD controlled variable to throttle control section 20.

Before the cruise control is started, that is, before cruise continuation signal turns from 0 to 1, transmission gear ratio calculating section 21c calculates the gear ratio of manual transmission 7 by dividing the engine speed sent from engine speed sensor 16 by the vehicle speed indicative signal sent from wheel speed sensor 15 upon taking account of the final reduction speed ratio produced by differential gear 9, and outputs the calculated gear ratio to pseudo vehicle speed signal calculating section 21d.

The calculation of the gear ratio of manual transmission 7 is executed upon taking account of a final reduction speed ratio of differential gear 9 located between manual transmission 7 and driving wheels 11.

Pseudo vehicle speed signal calculating section 21d calculates the pseudo vehicle speed signal by dividing the engine speed sent from engine speed sensor 16 by the gear ratio generated by manual transmission 7 upon taking account of the final reduction speed ratio produced by differential gear 9.

Vehicle speed comparing section 21e calculates a vehicle speed deviation, which is an absolute value of a value obtained by subtracting the pseudo vehicle speed signal sent from pseudo vehicle speed signal calculating section 21d from the vehicle speed indicative signal sent from wheel speed sensor 15.

When the vehicle speed deviation sent from vehicle speed comparing section 21e is greater than a preset value during the execution of the cruise control, cruise cancellation determining section 21f outputs the cruise cancel signal set at 1 to cruise start determining section 21a. When the cruise cancel signal is set at 1, engine controller 17 cancels the cruise control. Further, when cruise cancellation determining section 21f receives a braking execution indicative signal from brake switch 14, cruise cancellation determining section 21f outputs the cruise cancel signal set at 1 to cruise start determining section 21a.

In brief, a fundamental concept of the present invention is based on the following relationship. That is, when clutch 4 is in an engaged state, engine 1 is connected to a driveline constructed by clutch 4, manual transmission 7, differential gear 9, axles 10 and wheels 11. Accordingly, the following relationship is established among the rotation speed and engine 1, the gear ratio of manual transmission 7, a final speed reduction ratio produced by differential gear 9, and a rotation speed of wheel 11 when clutch 4 is put in the engaged state.

Engine rotation speed×Transmission gear ratio×Final speed reduction ratio=Wheel rotation speed On the other hand, when clutch 4 is in a disengaged state, the above relationship is not established. For example, the wheel rotation speed is kept constant, and only the engine rotation speed is raised up in the clutch disengaged state.

Therefore, when a deviation between a pseudo driveline rotation speed obtained on the assumption that clutch 4 is in the engaged state and the driveline rotation speed detection value detected by driveline rotation speed detecting means becomes greater than a predetermined value, it is determined that clutch 4 is in the disengaged state. Therefore, it becomes possible to execute the cancellation of the cruise control when clutch 4 is disengaged, by employing the above-discussed concept and without employing a clutch switch.

Subsequently, there will be discussed the manner of operation of the cruise control system according to the present invention. More specifically, there will be discussed the cruise-control canceling operation executed by cruise control section 21 of engine controller 17 through the disengaging operation of clutch 4, with reference to a flowchart of FIG. 2.

At step S1 controller 17 determines whether or not the cruise continuation signal is set at 1. When the cruise continuation signal is set at 1, the cruise control is continued. When the determination at step S1 is affirmative, the routine proceeds to step S3. When the determination at step S1 is negative, the routine proceeds to step S2.

At step S2 controller 17 sets the cruise cancel signal at 0 indicative that the cruise control is not cancelled, that is, the cruise control is continued. Thereafter, the routine proceeds to a return step.

At step S3 controller 17 determines whether or not the previous cruise continuation signal detected in the previous routine is set at 0 indicative that the cruise control is not executed. When the determination at step S3 is affirmative, the routine proceeds to step S4. When the determination at step S3 is negative, the routine proceeds to step S5.

At step S4 controller 17 executes a cruise starting processing when the cruise control is first started after the turning on of ASCD switch 13. More specifically, transmission gear ratio calculating section 21c of controller 17 calculates the gear ratio of manual transmission 7 by dividing the engine speed by the vehicle speed signal at transmission gear ratio calculating section 21c since it is determined that the cruise control is first executed after the turning of ASCD switch 13. Then, the routine proceeds to step S5.

At step S5, pseudo vehicle speed calculating section 21b of controller 17 calculates the pseudo vehicle speed signal by dividing the engine speed by the transmission gear ratio while taking account of the final reduction gear speed ration of differential gear 9.

At step S6, vehicle speed comparing section 21e of controller 17 calculates the vehicle deviation which is the absolute value of the value obtained by subtracting the pseudo vehicle speed signal calculated at pseudo vehicle speed signal calculating section 21b from the vehicle speed signal corresponding to the wheel speed signal detected by wheel speed sensor 15.

At step S7, cruise cancellation determining section 21f of controller 17 determines whether or not the vehicle speed deviation is greater than or equal to the predetermined value. When the determination at step S7 is affirmative, the routine proceeds to step S8. When the determination at step S7 is negative, the routine proceeds to step S2.

At step S8 controller 17 sets the cruise cancel signal at 1 indicative that the cruise control is cancelled. Then, the routine proceeds to the return step.

Subsequently there will be discussed problems of a cruise control system for a vehicle equipped with a manual transmission, particularly to problems raised in the cruise control system of earlier technology.

Generally, a cruise control system for a manual-transmission-equipped vehicle has the following problems I and II.

I. Clutch Disengaging Operation

If the cruise control is continued even after clutch 4 is disengaged during the execution of the cruise control, the engine is put in a racing state where the engine speed is raised up at a high speed. Therefore, it is necessary to cancel the cruise control when clutch 4 is disengaged. A cruise control system of the earlier technology accordingly comprises a clutch switch for detecting the disengagement of clutch 4 and cancels the cruise control in response to the disengagement of clutch 4.

Figure 3A:
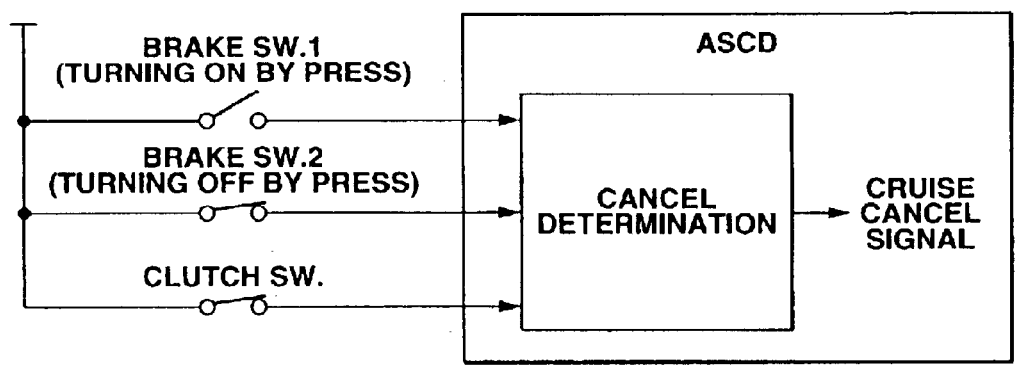
FIGS. 3A and 3B are block diagrams for executing a cruise-control canceling determination in earlier technology employing a clutch switch.
Figure 3B:
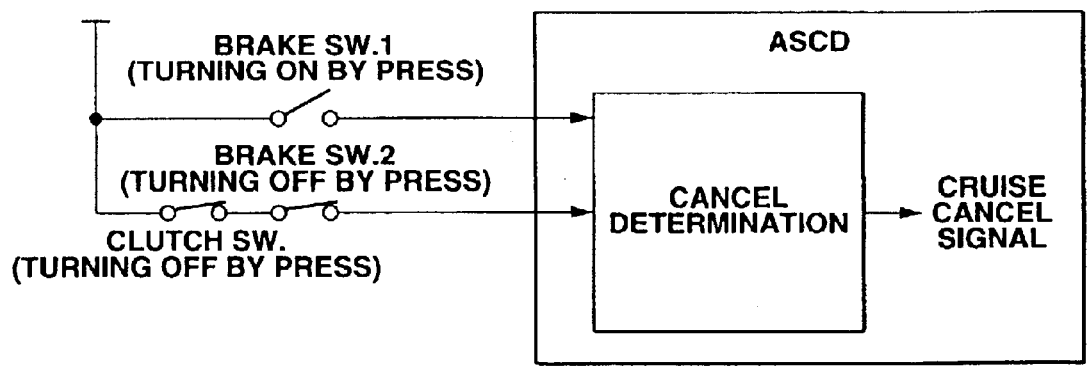

More specifically, as shown in FIG. 3A or 3B, the cancel signal outputted from the clutch switch is inputted to the cancellation determining section as is similar to the cancel signal outputted from the brake switch.

However, such provision of the clutch switch raises the production cost of the cruise control system of earlier technology.

II. Fail-safe of Vehicle Speed Signal

The vehicle speed is the most important signal for a cruise control system, which is arranged to set a desired vehicle speed and to control a throttle opening so as to bring the vehicle speed signal closer to the desired vehicle speed. Therefore, it is necessary to provide a fail-safe as to the vehicle speed. More specifically, if the inputted vehicle speed signal is put in the abnormal state, the cruise control system executes the unintended acceleration and/or deceleration as far as the cruise control is continued.

Conventionally, such a problem has been solved by the following methods (a) and (b):

(a) A cruise control system of earlier technology comprises a vehicle speed sensor (or wheel speed sensor) and a transmission output shaft rotation speed sensor, and detects the abnormality of each of the sensors by comparing the outputs of the sensors. Further, this cruise control system cancels the cruise control when the abnormality of one of the sensors is detected. However, when a vehicle equipped with a manual transmission does not normally have a transmission output shaft rotation speed sensor and requires another vehicle speed sensor connected to a line different from that of an already-existing sensor. This provision of a new speed sensor increases a production cost.

(b) Another cruise control system of earlier technology is arranged to determine the abnormality of the vehicle speed sensor when the vehicle speed signal abnormally changes, for example, when the vehicle speed signal suddenly fluctuates or drifts, and to cancel the cruise control when the abnormality of the sensor is detected. However, this system cannon detect small fluctuation and/or small drift as an abnormality. Therefore it is difficult to accurately determine the abnormality of the vehicle speed sensor. The continuation of such small fluctuation or drift also generates unintended acceleration or deceleration. Accordingly, it is necessary for the driver to execute a cruise-control canceling operation by intently depressing a brake pedal or clutch pedal to cancel the cruise control when the vehicle speed sensor is put in a controller undetectable abnormality.

[Cruise Control Canceling Operation]

When the vehicle travels under a turned-off state of cruise control switch 13, the routine in FIG. 2 proceeds from step S1 to step S2. Accordingly, both of the cruise continuation signal and the cruise cancel signal are set at 0 of an initial value. Therefore, the vehicle speed is determined by the accelerating operation and the braking operation of the driver.

Subsequently, when the vehicle travels under a turned-on state of cruise control switch 13, the routine in FIG. 2 proceeds from step S1 through step S3 to step S4. At step S4 the gear ratio of manual transmission 7 is calculated by dividing the engine speed by the vehicle speed signal.

When the second or more time control operation is executed and when clutch 4 is put in the engaged state, the routine in FIG. 2 proceeds from step S1 through step S3 and step S5 to step S6. At step S6 a vehicle speed deviation takes almost zero since the vehicle speed signal is substantially equal to the pseudo vehicle speed signal due to the engagement of clutch 4. Accordingly, the routine proceeds from step S6 through step S7 to step S2 wherein the cruise control is executed so as to bring the actual vehicle speed closer to the desired vehicle speed by the engine output control.

Thereafter, when the driver disengages clutch 4 even during the cruise control by depressing a clutch pedal 4, at step S6 in the flowchart of FIG. 2, the vehicle speed signal becomes different from pseudo vehicle speed signal. As a result, when the vehicle speed deviation becomes greater than the predetermined value, the routine proceeds from step S6 through step S7 to step S8 wherein the cruise cancel signal is set at 1, and therefore the cruise control is cancelled.

By this cancellation of the cruise control, the following three operations (1), (2) and (3) are realized.

(1) When clutch 4 is disengaged during the cruise control, the engine speed is raced and the pseudo vehicle speed calculated based on the engine speed also increases, and a difference is generated between the vehicle speed signal and the pseudo vehicle speed signal. As a result, the vehicle speed deviation between the vehicle speed signal and the pseudo vehicle speed signal becomes greater than the predetermined value after the disengagement of clutch 4 during the cruise control, and therefore the cruise control is cancelled.

Accordingly, the cancellation of the cruise control in reply to the disengagement of clutch 4 is executed without employing a clutch switch. This system enables the system to be produced by low production cost.

(2) When it is determined that the vehicle speed signal (input signal) is abnormal during the cruise control, the vehicle speed signal takes a value different from the actual vehicle speed. On the other hand, the pseudo vehicle speed signal calculated from the engine speed and the transmission gear ratio takes a value substantially equal to the actual vehicle speed. Accordingly, when the vehicle speed signal becomes abnormal during the cruise control, the vehicle speed deviation between the vehicle speed signal and the pseudo vehicle speed signal becomes greater than the predetermined value, and the cruise control is cancelled. This constructs a fail-safe of the vehicle speed signal without newly providing a different line vehicle speed sensor and with low cost.

(3) Cruise control section 21 of engine controller 17 employs the engine speed signal, which is used in the fuel injection control of engine 1, as a reference signal. Even if a cruise controller for the cruise control system according to the present invention is provided independently of engine controller 17, by connecting the cruise controller and engine controller 17 via CAN (controller area network) communication, it becomes possible that the cruise controller receives the engine speed signal through CAN communication.

Therefore, the cruise control system of the embodiment, which is arranged to execute the cruise control canceling operation using the engine speed signal and the vehicle speed signal, simultaneously realizes a salability for preventing the engine racing due to the disengagement of clutch 4, a safety for preventing the acceleration/deceleration due to the abnormality of the vehicle speed signal, and a cost saving for no addition of a new sensor such as a clutch switch or different vehicle speed sensor.

Subsequently, there will be discussed the advantages [1] through [5] of the cruise control system according to the embodiment of the present invention.

[1] The cruise control system of the embodiment according to the present invention is adapted to a vehicle equipped with manual transmission 7 and clutch 4 and to control the output of engine 1 so that the vehicle travels at a predetermined vehicle speed. The cruise control system comprises a cruise control canceling means which cancels the cruise control when the cruise control is being executed and when a deviation between the pseudo driveline rotation speed calculated on the assumption that clutch 4 and a detection value of the driveline rotation speed is greater than the predetermined value. Accordingly, it becomes possible to cancel the cruise control when clutch 4 is disengaged during when the cruise control is being executed, while suppressing a production cost of the system without adding a clutch switch.

[2] The vehicle speed signal detected by vehicle speed sensor 15 is employed as a compared reference, and the cruise control system is arranged such that pseudo vehicle speed signal calculating section 21d calculates the pseudo vehicle speed signal from the engine speed and the gear ratio of manual transmission 7, vehicle speed comparing section 21e calculates the vehicle speed deviation between the vehicle speed signal and the pseudo vehicle speed signal, and cruise cancellation determining section 21f cancels the cruise control when the vehicle speed deviation is greater than or equal to the predetermined value during the cruise control. Accordingly, the cruise control is canceled when clutch 4 is disengaged. This arrangement for this cancellation is achieved with low cost and without using a clutch switch. Further, the fail-safe of the vehicle speed signal is also achieved with low cost and without the addition of another vehicle speed sensor detected at the different line.

[3] The cruise control system according to the present invention employs engine speed sensor 16 for detecting the rotation speed of engine 1 and wheel speed sensor 15 for detecting the driving wheel speed connected to manual transmission 8. Pseudo vehicle speed signal calculating section 21d calculates the pseudo vehicle speed signal from the engine speed and the gear ratio of manual transmission 7. Vehicle speed comparing section 21e calculates the vehicle speed deviation which is an absolute value of a difference between the vehicle speed signal and the pseudo vehicle speed signal. Further, cruise cancellation determining section 21f outputs the cruise cancel signal for canceling the cruise control when the vehicle speed deviation is greater than the predetermined value during the cruise control. Therefore, the cruise control system of the vehicle equipped with the manual transmission simultaneously realizes a salability for preventing the engine racing due to the disengaged of clutch 4, a safety for preventing the acceleration/deceleration due to the abnormality of the vehicle speed signal, and a cost saving for no addition of a new sensor such as a clutch switch or different vehicle speed sensor.

[4] The cruise control system of the embodiment according to the present invention comprises transmission gear ratio calculating section 21c for calculating the gear ratio of manual transmission 7 from the engine speed and the vehicle speed signal at the moment of the start of the cruise control. Accordingly, the gear ratio of manual transmission 7 during the cruise control is accurately detected. More specifically, at the moment of starting the cruise control, clutch 4 is certainly put in the engaged state, and therefore the gear ratio of manual transmission is basically fixed during the cruise control.

[5] Transmission gear ratio calculating section 21c calculates the gear ratio of manual transmission 7 by dividing the engine speed detected by engine speed sensor 16 and the vehicle speed signal obtained from wheel speed sensor 15. Accordingly, it becomes possible to obtain the gear ratio information of manual transmission 7 without newly providing a sensor for detecting the gear ratio of manual transmission 7.

This application is based on Japanese Patent Applications No. 2002-14951 filed on Jan. 24, 2002 in Japan. The entire contents of this Japanese Patent Application are incorporated herein by reference.

Although the invention has been described above by reference to a certain embodiment of the invention, the invention is not limited to the embodiment described above. Modifications and variations of the embodiment described above will occur to those skilled in the art, in light of the above teaching. For example, although the embodiment has been shown and described so that the vehicle speed deviation between the vehicle speed signal and the pseudo vehicle speed signal is calculated by using the vehicle speed signal as a compared reference, an engine speed deviation between the engine speed and a pseudo engine speed may be calculated by calculating the pseudo engine speed from the vehicle speed signal and the transmission gear ratio by using the engine speed signal detected by engine speed sensor 16 as the compared reference.

Further, although the embodiment has been shown and described such that the gear ratio of manual transmission 7 is calculated at the moment of starting the cruise control, the gear ratio may be obtained by arranging manual transmission 7 so as to detect a selected position of a shift lever of manual transmission 7 and to determine the gear ratio according to the selected position.

The scope of the invention is defined with reference to the following claims.

What is claimed is:

1. A cruise control system for a vehicle equipped with an internal combustion engine and a manual transmission connected to the engine through a clutch, the clutch being capable of engaging and disengaging the engine and the manual transmission, the manual transmission being capable of producing a plurality of gear ratios and of selecting one of the gear ratios, the cruise control system comprising:

a first speed sensor detecting a first speed indicative of a rotation speed of the engine;

a second speed sensor detecting a second speed indicative of a wheel speed of the vehicle; and a controller connected to the first and second speed sensors, the controller being configured:

to start a cruise control for controlling an output of the engine so that the vehicle travels at a preset vehicle speed, in response to a driver's demand, to calculate a first vehicle operation indicative quantity based on the first speed, the first vehicle operation indicative quantity including at least a pseudo vehicle speed calculated from the first speed and the selected gear ratio of the manual transmission;

to calculate a second vehicle operation indicative quantity based on the second speed, the second vehicle operation indicative quantity including at least a vehicle speed obtained from the second speed;

to determine whether a deviation between the first vehicle operation indicative quantity and the second vehicle operation indicative quantity is greater than a predetermined value; and to cancel the cruise control when the deviation is greater than the predetermined value, wherein the pseudo vehicle speed is obtained by multiplying the first speed, the selected gear ratio of the manual transmission and a coefficient.

2. The cruise control system as claimed in claim 1, wherein the first speed sensor includes an engine speed sensor, the second speed sensor includes a wheel speed sensor for detecting a rotation speed of a wheel of the vehicle, a transmission output speed sensor for detecting a rotation speed of an output shaft of the manual transmission, or both the wheel speed sensor and the transmission output speed sensor.

3. A cruise control system for a vehicle equipped with an internal combustion engine and a manual transmission connected to the engine through a clutch, the clutch being capable of engaging and disengaging the engine and the manual transmission, the manual transmission being capable of producing a plurality of gear ratios and of selecting one of the gear ratios, the cruise control system comprising:

a first speed sensor detecting a first speed indicative of a rotation speed of the engine;

a second speed sensor detecting a second speed indicative of a wheel speed of the vehicle; and a controller connected to the first and second speed sensors, the controller being configured:

to start a cruise control for controlling an output of the engine so that the vehicle travels at a preset vehicle speed, in response to a driver's demand;

to calculate a first vehicle operation indicative quantity based on the first speed;

to calculate a second vehicle operation indicative quantity based on the second speed;

to determine whether a deviation between the first vehicle operation indicative quantity and the second vehicle operation indicative quantity is greater than a predetermined value;

to cancel the cruise control when the deviation is greater than the predetermined value, and to calculate the selected gear ratio from the first and second speeds at a moment when the cruise control is started.

4. The cruise control system as claimed in claim 3, wherein the controller is further configured to calculate the selected gear ratio by dividing the first speed by the second speed before the cruise control is started.

5. A method of canceling a cruise control executed by a cruise control system for a vehicle, the vehicle being equipped with an internal combustion engine and a manual transmission connected to the engine through a clutch, the clutch being capable of engaging and disengaging the engine and the manual transmission, the manual transmission being capable of producing a plurality of gear ratios and selecting one of the gear ratios, the method comprising:

detecting a first speed indicative of a rotation speed of the engine;

detecting a second speed indicative of a wheel speed of the vehicle;

starting a cruise control for controlling an output of the engine so that a vehicle travels at a preset vehicle speed, in response to a driver's demand;

calculating a first vehicle operation indicative quantity based on the first speed;

calculating a second vehicle operation indicative quantity based on the second speed;

determining whether a deviation between the first vehicle operation indicative quantity and the second vehicle operation indicative quantity is greater than a predetermined value;

canceling the cruise control when the deviation is greater than the predetermined value; and calculating the selected gear ratio from the first and second speeds at a moment when the cruise control is started.

6. A cruise control system for a vehicle equipped with an internal combustion engine and a manual transmission connected to the engine through a clutch, the clutch being capable of engaging and disengaging the engine and the manual transmission, the manual transmission being capable of producing a plurality of gear ratios and selecting one of the gear ratios, the cruise control system comprising:

first speed detecting means for detecting a first speed indicative of a rotation speed of the engine;

second speed detecting means for detecting a second speed indicative of a wheel speed of the vehicle;

cruise control starting means for starting a cruise control for controlling an output of the engine so that a vehicle travels at a preset vehicle speed, in response to a driver's demand;

first calculating means for calculating a first vehicle operation indicative quantity based on the first speed;

second calculating means for calculating a second vehicle operation indicative quantity based on the second speed;

determining means for determining whether a deviation between the first vehicle operation indicative quantity and the second vehicle operation indicative quantity is greater than a predetermined value;

cruise-control canceling means for canceling the cruise control when the deviation is greater than the predetermined value; and selected gear ratio calculating means for calculating the selected gear ratio from the first and second speeds at a moment when the cruise control is started.

7. A cruise control system for a vehicle comprising:

an internal combustion engine capable of generating a variable motive power;

a manual transmission capable of producing a plurality of gear ratios and capable of selecting one of the gear ratios;

a clutch disposed between the engine and the transmission, the clutch being capable of engaging and disengaging the engine and the manual transmission;

an engine speed sensor detecting a rotation speed of the engine;

a wheel speed sensor detecting a rotation speed of a wheel of the vehicle; and a controller connected to the engine, the engine speed sensor and the wheel speed sensor, the controller being configured:

to start a cruise control for controlling the motive power of the engine so that the vehicle travels at a preset vehicle speed, in response to a driver's demand;

to calculate a first vehicle operation indicative quantity based on the engine rotation speed;

to calculate a second vehicle operation indicative quantity based on the wheel rotation speed;

to determine whether a deviation between the first and second vehicle operation indicative quantities is greater than a predetermined value;

to cancel the cruise control when the deviation is greater than the predetermined value; and to calculate the selected gear ratio from the rotation speed of the engine and the rotation speed of the wheel at a moment when the cruise control is started.

8. A cruise control system for a vehicle equipped with an internal combustion engine and a manual transmission connected to the engine through a clutch, the clutch being capable of engaging and disengaging the engine and the manual transmission, the manual transmission being capable of producing a plurality of gear ratios and of selecting one of the gear ratios, the cruise control system comprising:

a first speed sensor detecting a first speed indicative of a rotation speed of the engine;

a second speed sensor detecting a second speed indicative of a wheel speed of the vehicle; and a controller connected to the first and second speed sensors, the controller being configured:

to start a cruise control for controlling an output of the engine so that the vehicle travels at a preset vehicle speed, in response to a driver's demand;

to calculate a first vehicle operation indicative quantity based on the first speed, the first vehicle operation indicative quantity including at least an engine speed obtained from the first speed;

to calculate a second vehicle operation indicative quantity based on the second speed, the second vehicle operation indicative quantity including at least a pseudo engine speed calculated from the second speed and the selected gear ratio;

to determine whether a deviation between the first vehicle operation indicative quantity and the second vehicle operation indicative quantity is greater than a predetermined value; and to cancel the cruise control when the deviation is greater than the predetermined value, wherein the pseudo engine speed is obtained by dividing the second speed by a product of the selected gear ratio and a coefficient.

9. The cruise control system as claimed in claim 8, wherein the first speed sensor includes an engine speed sensor, the second speed sensor includes a wheel speed sensor for detecting a rotation speed of a wheel of the vehicle, a transmission output speed sensor for detecting a rotation speed of an output shaft of the manual transmission, or both the wheel speed sensor and the transmission output speed sensor.

* * * * *